United States Patent
Yates et al.

(10) Patent No.: US 10,401,483 B2
(45) Date of Patent: Sep. 3, 2019

(54) DISTANCE MEASURING DEVICE AND METHOD FOR DETERMINING A DISTANCE

(71) Applicant: ODOS IMAGING LTD., Edinburgh (GB)

(72) Inventors: Chris Yates, Edinburgh (GB); Chris Softley, Gorebridge (GB); Stefan Maagh, Edinburgh (GB)

(73) Assignee: Odos Imaging Ltd., Edinburgh (GB)

( * ) Notice: Subject to any disclaimer, the term of this patent is extended or adjusted under 35 U.S.C. 154(b) by 254 days.

(21) Appl. No.: 15/611,749

(22) Filed: Jun. 1, 2017

(65) Prior Publication Data
US 2017/0328991 A1 Nov. 16, 2017

Related U.S. Application Data

(63) Continuation of application No. PCT/EP2015/076797, filed on Nov. 17, 2015.

(30) Foreign Application Priority Data

Dec. 2, 2014 (DE) .................. 10 2014 117 705

(51) Int. Cl.
*G01C 3/08* (2006.01)
*G01S 7/486* (2006.01)
(Continued)

(52) U.S. Cl.
CPC .......... *G01S 7/4865* (2013.01); *G01S 7/4814* (2013.01); *G01S 17/10* (2013.01)

(58) Field of Classification Search
CPC ...... G01S 7/4817; G01S 7/484; G01S 7/4863; G02B 26/0816; G02B 26/101
See application file for complete search history.

(56) References Cited

U.S. PATENT DOCUMENTS 4,302,084 A * 11/1981 Greenwald ............. G01S 17/10
396/106
6,111,241 A * 8/2000 English ................... G01S 7/486
250/203.2
(Continued)

FOREIGN PATENT DOCUMENTS

CN 1410826 A 4/2003
CN 1834687 A 9/2006
(Continued)

OTHER PUBLICATIONS

U.S. Appl. No. 15/154,639, filed May 13, 2016, Chris Yates et al.
(Continued)

*Primary Examiner* — Samantha K Abraham
(74) *Attorney, Agent, or Firm* — Ewers & Hasselmann PLLC (57) ABSTRACT

A method for determining a distance between a distance measuring device and an object includes the steps of illuminating the object with a short light pulse and long light pulses, outputting a signal value $U_{ref}$ at the end of an integration gate with an invariable delay between the emission start point in time of the short light pulse and integration start point in time $\Delta_s$, forming a convolution function $f_c := U(\tau)$ from the intensity of the light arriving on the photo element and $\Delta_s$ with a respective variable delay $\tau$ for each long light pulse between the emission start point in time of the long light pulses and the integration gate, the variable delays being different from each other to form the convolution function, identifying the delay $\tau_c$ in the convolution function which corresponds to $U_{ref}$ and calculating the distance by using the delay $\tau_c$ in the convolution function.

16 Claims, 3 Drawing Sheets

(51) Int. Cl.
*G01S 17/10* (2006.01)
*G01S 7/481* (2006.01)

(56) References Cited

U.S. PATENT DOCUMENTS

| | | | |
|---|---|---|---|
| 6,373,557 B1 | 4/2002 | Mengel et al. | |
| 6,647,205 B1 | 11/2003 | Kindaichi et al. | |
| 7,212,278 B2 | 5/2007 | Doemens et al. | |
| 7,323,987 B2* | 1/2008 | Seas | G01S 17/026 340/557 |
| 7,623,221 B2 | 11/2009 | Thun et al. | |
| 8,699,008 B2 | 4/2014 | Murakami et al. | |
| 2004/0233416 A1* | 11/2004 | Doemens | G01S 7/487 356/5.01 |
| 2005/0251844 A1* | 11/2005 | Martone | H04L 27/2662 725/118 |
| 2006/0214121 A1 | 9/2006 | Schrey et al. | |
| 2008/0144000 A1 | 6/2008 | Thun et al. | |
| 2015/0234038 A1 | 8/2015 | Yates et al. | |

FOREIGN PATENT DOCUMENTS

| | | |
|---|---|---|
| CN | 101114021 A | 1/2008 |
| CN | 202093171 U | 12/2011 |
| CN | 102378920 A | 3/2012 |
| CN | 102854510 A | 1/2013 |
| CN | 103605133 A | 2/2014 |
| DE | 19741887 A1 | 3/1999 |
| DE | 19833207 A1 | 2/2000 |
| DE | 102007046562 A1 | 4/2009 |
| DE | 102011081384 A1 | 2/2013 |
| EP | 1423731 B1 | 10/2006 |
| WO | 2014068061 A1 | 5/2014 |

OTHER PUBLICATIONS

International Search Report dated Feb. 15, 2016 of international application PCT/EP2015/076797 on which this application is based.
Office Action issued in European Patent Application No. EP 14801984.7, dated May 16, 2018 in English.
M. Nazarathy et al., "Real-Time Long Range Complementary Correlation Optical Time Domain Reflectometer," Journal of Lightwave Technology vol. 7(1): 24-38, Feb. 1989.
D. Huang et. al., "Research of Complementary Correlation Optical Time Domain Reflectometer," Journal of University of Electronic Science and Technology of China, Jun. 2005, vol. 34, No. 3 and English language Abstract thereof.
Office Action dated Mar. 19, 2019 issued in Chinese counterpart application No. 201580064827.1 and English-language machine translation thereof.

* cited by examiner

DISTANCE MEASURING DEVICE AND METHOD FOR DETERMINING A DISTANCE

CROSS REFERENCE TO RELATED APPLICATIONS

This application is a continuation application of international patent application PCT/EP2015/076797, filed Nov. 17, 2015, designating the United States and claiming priority to German application 10 2014 117 705.3, filed Dec. 2, 2014, and the entire content of both applications is incorporated herein by reference.

TECHNICAL FIELD

The invention relates to a distance measuring device and a method for determining a distance with the distance measuring device.

BACKGROUND

Distances can be measured between a measuring device and an object without a physical contact between the device and the object by optical methods. In these methods, the object is illuminated by the device and the light back-reflected from the object is then captured by a light detector of the device.

Distances can for example be determined by periodically modulating the light intensity which is emitted from the device and by measuring the phase difference between the emitted light and the back-reflected light arriving on the detector. However, due to the periodicity of the light intensity, this method results in an ambiguous distance measurement. Unambiguous distance measurements can be determined by measuring the time of flight between the emission of light and the arrival of the back-reflected light on the detector.

Conventional distance measurements are carried out by measuring a property of the light, in particular the intensity, as a function of time. Then a plot of the property versus the time is processed in order to obtain the time of flight. This processing can be computationally complicated and can therefore require a long time to be performed. If a distance measurement needs a long time to be performed, this can cause a reduction of the repetition rate for taking the distance measurements.

The precision of the conventional distance measurements is limited by the size of the time steps, with which the property of the light is measured. Also, for the conventional distance measurement, different reflectivities of the object can lead to different shapes of the plot. When processing a different plot, this can lead to a different distance, so that the distance depends on the reflectivity of the object, which further decreases the precision for the conventional distance measurements.

SUMMARY

It is an object of the invention to provide a distance measuring device and a method for measuring a distance with the distance measuring device, wherein the distance measurement is simple to perform whilst remaining precise.

The distance measuring device according to an aspect of the invention for measuring a distance between the distance measuring device and an object includes a light source configured to illuminate the object with light pulses having different durations, at least one photo element configured to capture the light pulses after being back-reflected from the object, a trigger generator for controlling the emission of the light pulses and for activating the photo element during a temporal integration gate having an integration start point in time $\Delta_s$ and an integration end point in time $\Delta_e$, wherein the photo element is configured to output a signal value U at the end of the integration gate with the signal value U depending on the energy of the light arriving on the photo element during its activation, and wherein the trigger generator is configured to store a trigger scheme to activate the photo element and to control the emission of the light pulses such that at least one short light pulse with a duration $T_{p,s}$ and a plurality of long light pulses with a duration $T_{p,l}$ being longer than $T_{p,s}$ are emitted, that an invariable delay between the emission start point in time of the short light pulse and the integration gate is such that $\Delta_{tof}$ and $\Delta_{tof}+T_{p,s}$ are between $\Delta_s$ and $\Delta_e$ to output a reference signal value $U_{ref}$, with $\Delta_{tof}$ being the first point in time when the light pulse arrives on the photo element, and that for each long light pulse a respective variable delay $\tau$ between the emission start point in time of the long light pulses and the integration gate is such that the variable delays $\tau$ are different from each other in order to form a convolution function $f_c:=U(\tau)$ out of the intensity of the light arriving on the photo element and the integration gate, and a processing unit configured to identify the delay $\tau_c$ in the convolution function which corresponds to $U_{ref}$ and to calculate the distance by using the delay $\tau_c$.

The method according to an aspect of the invention for determining a distance between the distance measuring device and an object by the distance measuring device includes the steps of: a) illuminating the object with at least one short light pulse with the duration $T_{p,s}$; b) illuminating the object with a plurality of long light pulses with the duration $T_{p,l}$; c) outputting a signal value $U_{ref}$ at the end of the integration gate, wherein an invariable delay between the emission start point in time of the short light pulse and the integration gate is such that $\Delta_{tof}$ and $\Delta_{tof}+T_{p,s}$ are between $\Delta_s$ and $\Delta_e$; d) forming a convolution function $f_c:=U(\tau)$ out of the intensity of the light arriving on the photo element and the integration gate with a respective variable delay $\tau$ for each long light pulse between the emission start point in time of the long light pulses and the integration gate, wherein the variable delays are different from each other in order to form the convolution function $f_c$; e) identifying the delay $\tau_c$ in the convolution function which corresponds to $U_{ref}$; and f) calculating the distance by using the delay $\tau_c$ in the convolution function as identified in step f).

The convolution function $f_c$ can be described by the following equation:

$$f_c(\tau) = \int_{-\infty}^{+\infty} I(t) * g(t-\tau) dt \qquad \text{(equation 1)},$$

wherein $I(t)$ is the intensity of the light of the long light pulses arriving on the photo element and $g(t)$ is the temporal integration gate. For early variable delays $\tau$ with no overlap of the integration gate and the long light pulses arriving on the photo element, the convolution function has a stationary value. The function value begins to change as soon as the delay $\tau$ is so long that the integration gate and the long light pulses begin to overlap. The convolution function includes an extreme value at delays $\tau$ with a maximum overlap of the integration gate and the long light pulses. The extreme value in the convolution function is a single point if the long light pulses and the integration gate have the same durations and is a plateau that becomes broader for an increasing difference in the durations of the long light pulses and the integration gate. By increasing the delay $\tau$ from the extreme value further, the function value develops back to the stationary value. The delay $\tau_c$ in convolution function $f_c$, which corresponds to the reference signal value $U_{ref}$, is the intersection of the convolution function $f_c$ and the function $U=U_{ref}$. The intersection can, for example, be identified by forming the inverse function $\tau(U)$ of the convolution function $f_c$ and then forming $\tau_c(U_{ref})$, which is a mathematically simple method. Alternatively, the intersection can be identified by parametrizing the convolution function prior to measurement and by performing fits to the measured data before extracting the actual intersection analytically from the fitted convolution function and the function $U=U_{ref}$. By performing the fit, it is possible to assess time steps between the measured data points, which provides an increased precision in the measurement of the delay $\tau_c$. By obtaining the increased precision for $\tau_c$, one also obtains an increasing precision for the distance. By identifying the intersection of the function $U=U_{ref}$ and the convolution function, it is also achieved that different reflectivities of the object are compensated.

The convolution function has two delays $\tau_c$, at which $f_c=U_{ref}$, one on each side of the extreme value. It is conceivable to form the convolution function only on one side of the extreme value and to identify only one delay $\tau_c$ or it is conceivable to form the convolution function on both sides of the extreme value and to identify both delays $\tau_c$. If both delays are identified, it is then possible to calculate a distance for each delay $\tau_c$, and it is then possible to form the average of both distances, which increases the accuracy of the distance measurement.

In order to arrange the integration gates with respect to the emission start point in time a distance range in which the object can be located is predetermined. From the distance range, the invariable delay can be chosen such that $\Delta_{tof}$ and $\Delta_{tof}+T_{p,s}$ are between $\Delta_s$ and $\Delta_e$ for all possible distances of the distance range. Also, the invariable delays can be chosen such that the convolution function is formed.

According to an aspect of the invention, the light source includes light emitting diodes, VCSELs (vertical-cavity surface-emitting lasers) and/or lasers that are in particular configured to emit light in the visible and/or infrared spectral region. According to an aspect of the invention, the distance measuring device includes a CCD chip with an image intensifier and/or a CMOS chip that includes the at least one photo element.

According to a further aspect of the invention, the trigger scheme is arranged to control the emission of the light pulses such that the object is illuminated alternatingly with the short light pulses and the long light pulses. Since the short light pulses are used for the reference signal value $U_{ref}$, a possible long-time drift in laser intensity would affect both the convolution function $f_c$ and $U_{ref}$ in the same manner, so that the long-time drift would be compensated by the alternating short light pulses and long light pulses. According to an aspect of the invention, the ratio of the number of the short light pulses to the number of the long light pulses is in a range of from 0.2 to 0.4. Surprisingly, experimental results showed that this ratio resulted in the highest precision for the distances.

According to yet another aspect of the invention, the trigger scheme is configured to control the emission of the light pulses such that the intensity of the light pulses rises from an intensity $I_1$ to an intensity $I_2$ being higher than $I_1$ at the emission start point in time and drops back to $I_1$ after the durations $T_{p,s}$, and $T_{p,l}$ from the emission start point in time, respectively, wherein $T_{p,s}$, and $T_{p,l}$ are in the order of tens of nanoseconds. Here, the extreme value of the convolution function is a maximum. Alternatively, the trigger scheme is arranged to control the emission of the light pulses such that the intensity of the light pulses drops from an intensity $I_2$ to an intensity $I_1$ being lower than $I_2$ at the emission start point in time and rises back to $I_2$ after the durations $T_{p,s}$, and $T_{p,l}$ from the emission start point in time, respectively, wherein $T_{p,s}$, and $T_{p,l}$ are in the order of tens of nanoseconds. Here, the extreme value of the convolution function is a minimum. By using the light pulses that include the intensity drop at the emission start point in time, it is advantageously possible with the distance measuring device to both measure a distance and to illuminate the object. The illumination of the object can be such that the object becomes visible for a human eye or for another vision system. Furthermore, it is not required to use an additional illumination system that would interfere with the distance measurement, whereby the precision for the distance measurement is high.

According to an aspect of the invention, in steps a) and b) the object is illuminated alternatingly with the short light pulses and the long light pulses. According to another aspect of the invention, the ratio of the number of the short light pulses to the number of the long light pulses is in a range of from 0.2 to 0.4.

According to yet another aspect of the invention, in step d) the convolution function is fitted to the plot of the signal values $U_n$ versus the variable delay $\tau$, wherein the convolution function $f_c$ includes a linear function. By using the fit, the convolution function $f_c$ can be determined with an arbitrary step size, advantageously increasing the precision of the distance measurement independent from the number of different delays $\tau$ between the emission start point in time of the long light pulses and the integration gate. Therefore, the distance can also be determined with an arbitrary step size. Since the delay $\tau_c$ in the convolution function, which corresponds to $U_{ref}$, is identified, it is advantageously sufficient to fit only one linear function to the plot, which is computationally simple. This is not the case if for example an extreme value of the convolution function is identified. For identifying the extrema, a respective linear function on both sides of the extreme value has to be fitted to the plot and the intersection of both linear functions has to be calculated, which is computationally difficult.

According to an aspect of the invention, in step d) the convolution function $f_c$ is formed by first forming a coarse convolution function $f_{c,coarse}$ with coarse steps of the different variable delays $\tau_{coarse}$, by subsequently identifying in the coarse convolution function $f_{c,coarse}$ a coarse delay $\tau_{c,coarse}$ that corresponds to $U_{ref}$ and the two variable delays $\tau_{l,coarse}$ and $\tau_{r,coarse}$ neighbouring $\tau_{c,coarse}$, and by then forming the convolution function $f_c$ between $\tau_{l,coarse}$ and $\tau_{r,coarse}$ with fine steps having a shorter step size than the coarse steps. This provides an efficient method for determining the distance with a high precision.

The intensity of the light pulses preferably rises from an intensity $I_1$ to an intensity $I_2$, the intensity $I_2$ being higher than $I_1$ at the emission start point in time and drops back to $I_1$ after the durations $T_{p,s}$, and $T_{p,l}$ from the emission start point in time, respectively, wherein $T_{p,s}$, and $T_{p,l}$ are in the order of tens of nanoseconds. Alternatively, the intensity of the light pulses preferably drops from an intensity $I_2$ to an intensity $I_1$, the intensity $I_1$ being lower than $I_2$ at the emission start point in time and the intensity rises back to $I_2$ after the durations $T_{p,s}$, and $T_{p,l}$ from the emission start point in time, respectively, wherein $T_{p,s}$, and $T_{p,l}$ are in the order of tens of nanoseconds.

According to a further aspect of the invention, in step e) the average over a plurality of reference signal values $U_{ref}$ is used for identifying $\tau_c$, in particular over all the signal values $U_{ref}$. This results in a high precision determination for the signal values $U_{ref}$ and therefore also in a high precision determination for the distance.

BRIEF DESCRIPTION OF THE DRAWINGS

The invention will now be described with reference to the drawings wherein.

DESCRIPTION OF EXEMPLARY EMBODIMENTS

Figure 1:
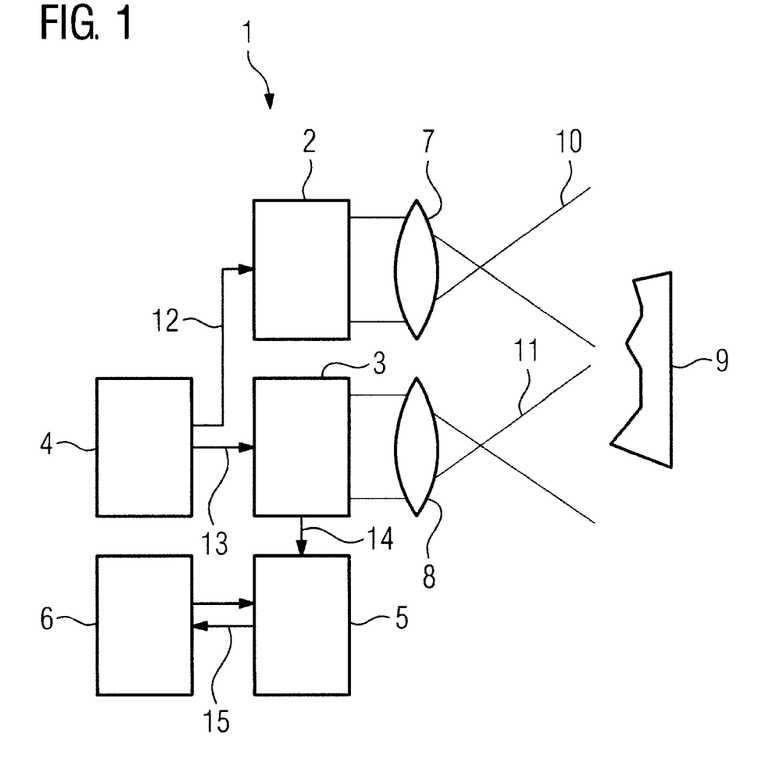
FIG. 1 shows a schematic cross section through a distance measuring device.

FIG. 1 shows a distance measuring device 1. The distance measuring device 1 includes a light source 2, a photo element 3, a trigger generator 4, a memory unit 5 and a processing unit 6. The light source 2 includes light emitting diodes, VCSELs (vertical-cavity surface-emitting lasers) and/or lasers, wherein the light emitting diodes, VCSELs and/or the lasers are configured to emit light in the visible and/or infrared spectral region. The distance measuring device 1 includes a CCD chip with an image intensifier and/or a CMOS chip that includes the at least one photo element 3 and at least one condenser that can be discharged via a photodiode. The trigger generator 4 provides an activation signal 12 for controlling the emission of the light source 2 and an activation signal 13 for activating the photo element 3 during a temporal integration gate 21. The CCD chip is activated by switching on the image intensifier and the CMOS chip is activated by closing a switch in the circuit of the condenser and the photodiode which allows that the condenser is discharged via the photodiode. The photo element 3 is configured to output a signal value U at the end of the integration gate 21, wherein the signal value U depends on the energy of the light arriving on the photo element during its activation. The signal value U is read out in a readout operation 14 and stored in the memory unit 5. The memory unit 5 is configured to store a multitude of signal values U. The multitude of the signal values U is then processed by the processing unit 6 in a processing operation 15 in order to determine a distance between the distance measuring device 1 and the object 9.

Detection optics 8 are arranged in front of the photo element 3 in order to image a field of view 11 onto the photo element 3. Illumination optics 7 are arranged in front of the light source 2 in order to shape the light emitted by the light source 2 such that an illumination area 10 can be illuminated by the light source 2. The illumination area 10 and the field of view 11 are shaped such that the field of view 11 is substantially completely covered by the illumination area 10. The distance measuring device 1 is configured such that the light emitted by the light source 2 impinges onto the object 9 located within the field of view 11, and arrives on the photo element 3 after being back-reflected from the object 9. The illumination optics 7 and the detection optics 8 are preferably respective lenses. It is also possible to use a single lens for both the illumination optics 7 and the detection optics 8.

Figure 2:
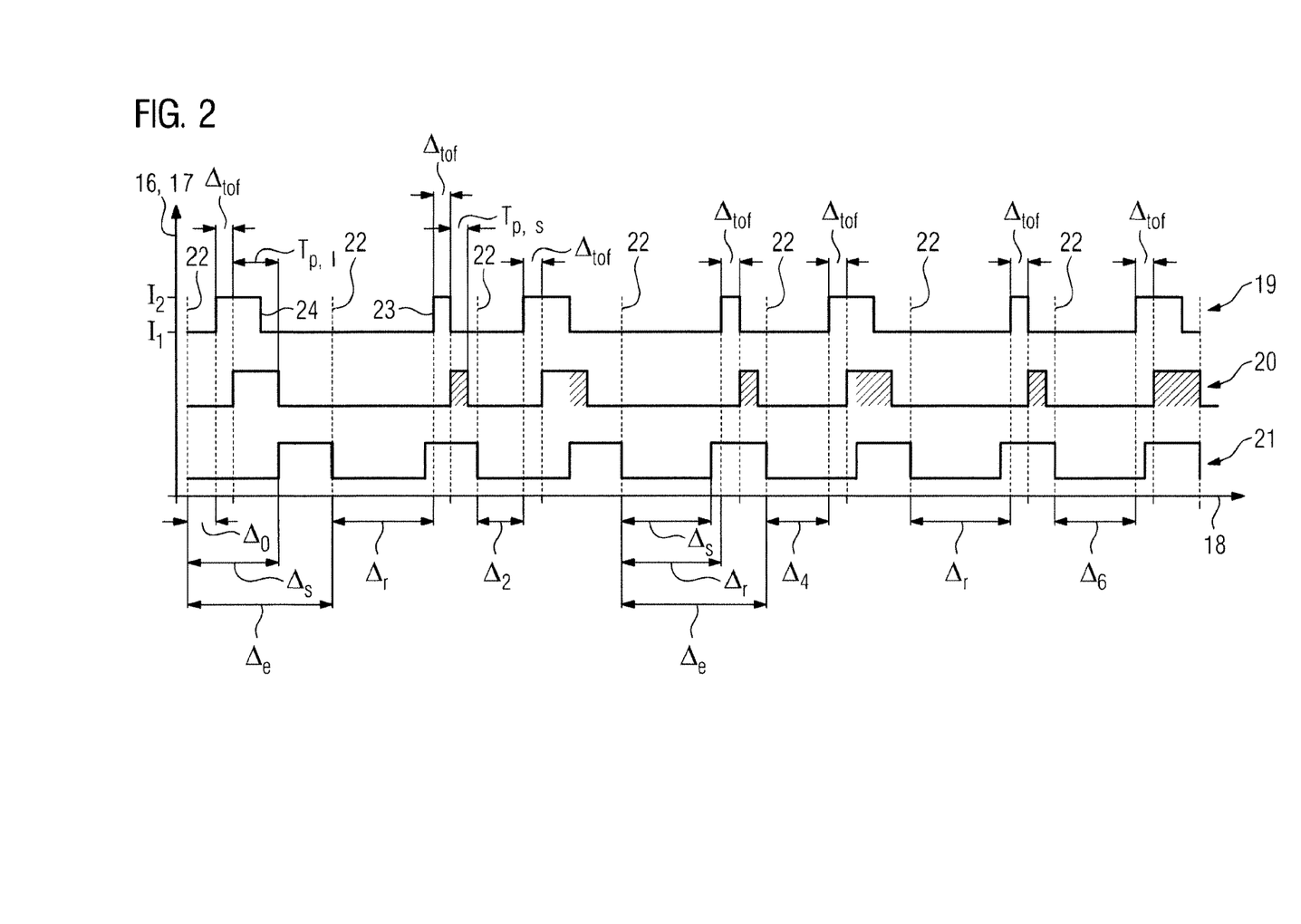
FIG. 2 shows temporal profile diagrams with integration gates and intensities of light pulses.

In FIG. 2, three temporal profile diagrams are shown, wherein an intensity 16 and a gate 17 is plotted versus time 18. The first temporal profile diagram is a plot of the intensity of the emitted light pulses 19 versus the time 18, the second temporal profile time diagram is a plot of the intensity of the light pulses 20 arriving on the photo element 3 versus the time 18, and the third temporal profile diagram is a plot of the integration gate 21 versus the time 18. The trigger generator 4 controls the emission of the light source 2 such that a plurality of short light pulses 23 having a first duration $T_{p,s}$ and a plurality of long light pulses 24 having a second duration $T_{p,l}$ is emitted, wherein $T_{p,s} < T_{p,l}$. The light pulses 23, 24 in FIG. 2 are such that at an emission start point in time of the light pulses 23, 24, their intensity is switched from $I_1$ to $I_2$, wherein $I_2 > I_1$. After the durations $T_{p,s}$ and $T_{p,l}$ from the emission start point in time, respectively, the intensity of the light pulses 23, 24 is switched back to $I_1$. In another exemplary embodiment, the intensity of the light pulses 23, 24 is switched at the emission start point in time of the light pulses 23, 24 from $I_2$ to $I_1$ and after the durations $T_{p,s}$ and $T_{p,l}$ from the emission start point in time, respectively, back to $I_2$, wherein $I_2 > I_1$. In both exemplary embodiments, $I_1$, and $I_2$, respectively, are the same for the short light pulses 23 and the long light pulses 24.

FIG. 2 shows that one respective short light pulse 23 and one respective long light pulse 24 are emitted alternatingly. In another exemplary embodiment, one respective short light pulse 23 and three respective consecutive long light pulses 24 are emitted alternatingly, so that the ratio of the number of the short light pulses 23 to the number of the long light pulses 24 is ⅓. As shown in FIG. 2, after a duration $\Delta_{tof}$ from the emission start point in time, the light pulses 23, 24 begin to arrive on the photo element 3. The integration gates 21 have or add an invariable delay to each of the emission start points in time of the short light pulses 23, wherein the invariable delay is chosen such that the short light pulses 23 arriving on the photo element 3 are completely captured within the integration gate 21. The integration gates have or add a variable delay τ to each of the emission start points in time of the long light pulses 24, wherein the variable delay τ is varied such that a convolution function $f_c := U(\tau)$ is formed out of the intensity of the light of the long light pulses 20, 24 arriving on the photo element 3 and the integration gate 21. The convolution function $f_c$ can mathematically be described by equation 1.

In FIG. 2, the variable delay τ is varied by choosing an invariable integration start point in time $\Delta_s$ and an invariable integration end point in time $\Delta_e$ of the integration gates 21 from a start point in time 22 as well as by choosing a variable delay $\Delta_n$ of the emission start point in time of the long light pulses 24 to the start point in time 22, wherein $\Delta_n$ is the delay for the n-th light pulse 23, 24 and $\Delta_n$ is different for each long light pulse 24. It is also conceivable to leave the delay from the emission start point in time of the long light pulses 24 to the start point in time 22 constant as well as to vary the integration start point in time $\Delta_s$ and the integration end point in time $\Delta_e$. The start point in time 22 is chosen such that it coincides with $\Delta_s$ of the preceding integration gate 21. But it is also conceivable to choose any other point in time for the start point in time 22.

In order to achieve that each short light pulse 23 is completely within the integration gates 21 the invariable delay $\Delta_r$ of the emission start point in time of the short light pulses 23 from the start point in time 22 is chosen such that $\Delta_r + \Delta_{tof}$ and $\Delta_r + \Delta_{tof} + T_{p,s}$ are between $\Delta_s$ and $\Delta_e$. Furthermore, it is required that the duration of the short light pulses $T_{p,s}$ are shorter than the duration $|\Delta_e - \Delta_s|$ of the integration gates 21: $T_{p,s} < |\Delta_e - \Delta_s|$. The duration $|\Delta_s - \Delta_e|$ of the integration gates 21 is the same for both the short light pulses 23 and the long light pulses 24.

The hatched areas in FIG. 2 are proportional to the energy of the light arriving on the photo element 3 during its activation. A reference signal value $U_{ref}$ which is the average of all the signal values being output at the end of the integration gates 21 for the short light pulses 23 is determined. For each of the long light pulses 24 a respective signal value U is determined.

Figure 3:
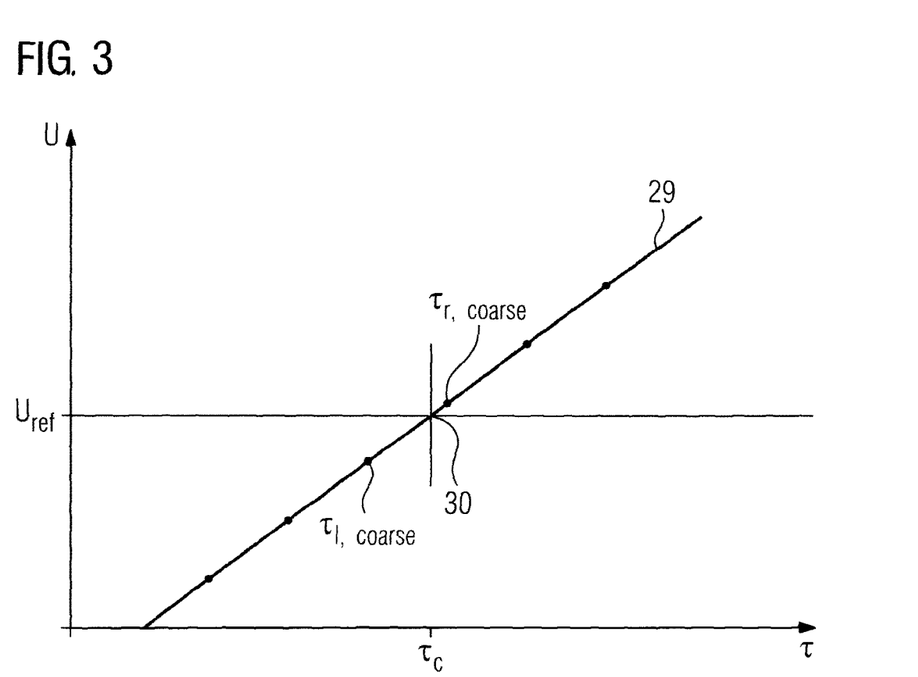
FIG. 3 shows a section of a convolution function.

FIG. 3 illustrates the formation of the convolution function $f_c$ and how the convolution function $f_c$ is evaluated in order to determine the distance. For forming the convolution function $f_c$ of FIG. 3 the light pulses 23, 24 and integrations gates 21 according to FIG. 2 were used. FIG. 3 shows a plot of the signal values U determined at the end of the integration gates 21 for the long light pulses 24 versus the variable delay τ. In this plot, the signal values U were taken only for delays τ that correspond to shorter delays than a delay $\tau_{max}$, wherein $\tau_{max}$ corresponds to a delay having a maximum overlap of the long light pulses 24 and the integration gate 21 and corresponds to a maximum in convolution function $f_c$. The convolution function $f_c$ includes a linear function 29 fitted to the plot of U versus τ. After fitting the linear function 29, a delay $\tau_c$ in the linear function 29 is identified which corresponds to $U_{ref}$. $\tau_c$ corresponds to the intersection 30 of the linear function 29 with the function $U=U_{ref}$. For $\tau_c$ in FIG. 3, it is: $\tau_c+T_{p,s}=\Delta_{tof}+T_{p,l}$, whereby:

$$\Delta_{tof}=\tau_c+T_{p,s}-T_{p,l} \quad \text{(equation 2)}.$$

In case that the signal values U were taken for delays τ that correspond to longer delays, the delay $\tau_{max}$ is: $\tau_c+(\Delta_e-\Delta_s)=\Delta_{tof}+T_{p,s}$, whereby:

$$\Delta_{tof}=\tau_c+(\Delta_e-\Delta_s)-T_{p,s} \quad \text{(equation 3)}.$$

For both cases, the distance r between the distance measuring device and the object is then calculated by:

$$r=0.5*c*\Delta_{tof} \quad \text{(equation 4)},$$

wherein c is the speed of light in the medium in which the distance measurement is carried out.

It is conceivable that the convolution function $f_c$ is formed by first forming a coarse convolution function $f_{c,coarse}$ with coarse steps of the different variable delays $\tau_{coarse}$, subsequently identifying in the coarse convolution function $f_{c,coarse}$ a coarse delay $\tau_{c,coarse}$ that corresponds to $U_{ref}$ and the two variable delays $\tau_{l,coarse}$ and $\tau_{r,coarse}$ neighbouring $\tau_{c,coarse}$, and then forming the convolution function $f_c$ between $\tau_{l,coarse}$ and $\tau_{r,coarse}$ with fine steps having a shorter step size than the coarse steps.

It is understood that the foregoing description is that of the exemplary embodiments of the invention and that various changes and modifications may be made thereto without departing from the spirit and scope of the invention as defined in the appended claims.

LIST OF REFERENCE NUMERALS 1 distance measuring device
2 light source
3 photo element
4 trigger generator
5 memory unit
6 processing unit
7 illumination optics
8 detection optics
9 object
10 illumination area
11 field of view
12 activation signal for light source
13 activation signal for photo element
14 readout operation
15 processing operation
16 intensity
17 gate
18 time
19 intensity of emitted light pulses
20 intensity of light pulses arriving on the photo element
21 temporal integration gates
22 start point in time
23 short light pulse
24 long light pulse
29 linear function
30 intersection
$\Delta_r$ fixed delay
$\Delta_0, \Delta_2, \Delta_4, \Delta_6$ variable delays
$\Delta_{tof}$ time of flight
$T_{p,s}$ duration of short light pulse
$T_{p,l}$ duration of long light pulse
$\Delta_s$ integration start point in time
$\Delta_e$ integration end point in time
U signal value
$U_{ref}$ reference signal value
$I_1$ lower intensity
$I_2$ higher intensity

What is claimed is:

1. A distance measuring device for measuring a distance between the distance measuring device and an object, the distance measuring device comprising:
a light source configured to illuminate the object with light pulses, the light pulses having different durations, respectively;
at least one photo element configured to capture the light pulses after being back-reflected from the object;
a trigger generator configured for controlling an emission of the light pulses and for activating the at least one photo element during a temporal integration gate;
the temporal integration gate having an integration start point in time $\Delta_s$ and an integration end point in time $\Delta_e$;
the at least one photo element being configured to output a signal value U at an end of the temporal integration gate;
the signal value U depending on an energy of light arriving on the at least one photo element when the at least one photo element is activated;
the trigger generator being configured to store a trigger scheme to control the emission of the light pulses and to activate the at least one photo element to:
emit at least one short light pulse with a first duration $T_{p,s}$ and a plurality of long light pulses with a second duration $T_{p,l}$, the second duration $T_{p,l}$ being longer than the first duration $T_{p,s}$;
define an invariable delay between an emission start point in time of the at least one short light pulse and the integration gate by a time of flight $\Delta_{tof}$ to output a reference signal value $U_{ref}$, the time of flight $\Delta_{tof}$ being a first point in time when the at least one short light pulse arrives on the at least one photo element, and a sum of the time of flight and the first duration $\Delta_{tof}+T_{p,s}$ being a time between the integration start point in time $\Delta_s$ and the integration end point in time $\Delta_e$; and
define respective variable delays τ for each of the plurality of long light pulses between an emission start point in time of the long light pulses and the integration gate, the respective variable delays τ being different from each other to define a convolution function $f_c := U(\tau)$ from an intensity of the light arriving on the at least one photo element and the integration gate; and a processing unit configured to:
identify a convolution delay $\tau_c$ in the convolution function which corresponds to the reference signal value $U_{ref}$; and
calculate the distance based on the convolution delay $\tau_c$.

2. The distance measuring device of claim 1, wherein the light source includes at least one of light emitting diodes, vertical-cavity surface-emitting lasers (VCSELs) and lasers that are configured to emit the light in at least one of a visible spectral region and an infrared spectral region.

3. The distance measuring device of claim 1, further comprising a CCD chip including at least one of an image intensifier and a CMOS chip, the CMOS chip including the at least one photo element.

4. The distance measuring device of claim 1, wherein the trigger scheme controls the emission of the light pulses to illuminate the object alternatingly with the short light pulses and the long light pulses.

5. The distance measuring device of claim 4, wherein a ratio of a number of the short light pulses to a number of the long light pulses is in a range of from 0.2 to 0.4.

6. The distance measuring device according of claim 1, wherein:
the trigger scheme controls the emission of the light pulses to raise the intensity of the light pulses from a first intensity $I_1$ to a second intensity $I_2$, the second intensity $I_2$ being higher than the first intensity $I_1$ at the emission start point in time and to drop back to the first intensity $I_1$ after the first duration $T_{p,s}$ and the second duration $T_{p,l}$ from the emission start point in time, respectively, and
the first duration $T_{p,s}$ and the second duration $T_{p,l}$ are in an order of tens of nanoseconds.

7. The distance measuring device of claim 1, wherein:
the trigger scheme is configured to control the emission of the light pulses to drop the intensity of the light pulses from a second intensity $I_2$ to a first intensity $I_1$, the first intensity $I_1$ being lower than the second intensity $I_2$ at the emission start point in time, and to raise the intensity of the light pulses back to the second intensity $I_2$ after the first duration $T_{p,s}$ and the second duration $T_{p,l}$ from the emission start point in time, respectively, and
the first duration $T_{p,s}$ and the second duration $T_{p,l}$ are in an order of tens of nanoseconds.

8. A method for determining a distance between a distance measuring device and an object, the distance measuring device including a light source configured to illuminate the object with light pulses, the light pulses having different durations, respectively, at least one photo element configured to capture the light pulses after being back-reflected from the object, a trigger generator configured for controlling an emission of the light pulses and for activating the at least one photo element during a temporal integration gate, the temporal integration gate having an integration start point in time $\Delta_s$ and an integration end point in time $\Delta_e$, the at least one photo element being configured to output a signal value U at an end of the temporal integration gate, the signal value U depending on an energy of light arriving on the at least one photo element when the at least one photo element is activated, the trigger generator being configured to store a trigger scheme to control the emission of the light pulses and to activate the at least one photo element to: emit at least one short light pulse with a first duration $T_{p,s}$ and a plurality of long light pulses with a second duration $T_{p,l}$, the second duration $T_{p,l}$ being longer than the first duration $T_{p,s}$, define an invariable delay between an emission start point in time of the at least one short light pulse and the integration gate by a time of flight $\Delta_{tof}$ to output a reference signal value $U_{ref}$, the time of flight $\Delta_{tof}$ being a first point in time when the at least one short light pulse arrives on the at least one photo element, and a sum of the time of flight and the first duration $\Delta_{tof}+T_{p,s}$ being a time between the integration start point in time $\Delta_s$ and the integration end point in time $\Delta_e$, and define respective variable delays $\tau$ for each of the plurality of long light pulses between an emission start point in time of the long light pulses and the integration gate, the respective variable delays $\tau$ being different from each other to define a convolution function $f_c := U(\tau)$ from an intensity of the light arriving on the at least one photo element and the integration gate, and a processing unit configured to: identify a convolution delay $\tau_c$ in the convolution function which corresponds to the reference signal value $U_{ref}$; and calculate the distance based on the convolution delay $\tau_c$., the method comprising the steps of:

a) illuminating the object with the at least one short light pulse having the first duration $T_{p,s}$;
b) illuminating the object with the plurality of long light pulses having the second duration $T_{p,l}$;
c) outputting the reference signal value $U_{ref}$ at the end of the integration gate, the invariable delay between the emission start point in time of the at least one short light pulse and the integration start point in time $\Delta_s$ being defined by the time of flight $\Delta_{tof}$, and the sum of the time of flight and the first duration $\Delta_{tof}+T_{p,s}$ being the time between the integration start point in time $\Delta_s$ and the integration end point in time $\Delta_e$;
d) defining the convolution function $f_c := U(\tau)$ from the intensity of the light arriving on the at least one photo element and the integration gate with the respective variable delay $\tau$ for each of the long light pulses between the emission start point in time of the long light pulses and the integration end point in time $\Delta_s$, the variable delays being different from each other to define the convolution function;
e) identifying the convolution delay $\tau_c$ in the convolution function which corresponds to the reference signal value $U_{ref}$; and
f) calculating the distance by using the convolution delay $\tau_c$ in the convolution function as identified in step e).

9. The method of claim 8, wherein in steps a) and b), the object is illuminated alternatingly with the at least one short light pulse and the plurality of long light pulses.

10. The method of claim 9, wherein a ratio of a number of the short light pulses to a number of the long light pulses is in a range of from 0.2 to 0.4.

11. The method of claim 8, wherein:
in step d), the convolution function is fitted to the plot of the signal values $U_n$ versus the variable delay $\tau$, and the convolution function $f_c$ is a linear function.

12. The method of claim 8, wherein in step d), the convolution function $f_c$ is defined by first forming a coarse convolution function $f_{c,coarse}$ with coarse steps of different variable delays $\tau_{coarse}$, subsequently identifying in the coarse convolution function $f_{c,coarse}$, a coarse delay $\tau_{c,coarse}$ that corresponds to the reference signal value $U_{ref}$ and the two variable delays $\tau_{l,coarse}$ and $\tau_{r,coarse}$ neighbouring $\tau_{c,coarse}$, and then forming the convolution function $f_c$ between $\tau_{l,coarse}$ and $\tau_{r,coarse}$ with fine steps having a step size that is shorter than a step size of the coarse steps.

13. The method of claim 8, further comprising the steps of:
- raising the intensity of the light pulses from a first intensity $I_1$ to a second intensity $I_2$, the second intensity $I_2$ being higher than the first intensity $I_1$ at the emission start point in time; and
- dropping back to the first intensity $I_1$ after the first and second durations $T_{p,s}$, and $T_{p,l}$ from the emission start point in time, respectively, the first and second durations $T_{p,s}$, and $T_{p,l}$ being in an order of tens of nanoseconds.

14. The method of claim 8, further comprising the steps of:
- dropping the intensity of the light pulses from a second intensity $I_2$ to a first intensity $I_1$, the first intensity being lower than the second intensity $I_2$ at the emission start point in time; and
- raising the intensity back to the second intensity $I_2$ after the first and second durations $T_{p,s}$, and $T_{p,l}$ from the emission start point in time, respectively,
- wherein the first and second durations $T_{p,s}$, and $T_{p,l}$ are in an order of tens of nanoseconds.

15. The method of claim 8, wherein in step e), an average over a plurality of reference signal values $U_{ref}$ is utilized for identifying the convolution delay $\tau_c$.

16. The method of claim 8, wherein in step e), an average over all of reference signal values $U_{ref}$ is utilized for identifying the convolution delay $\tau_c$.

* * * * *